United States Patent [19]
Jungerman

[11] Patent Number: 5,905,828
[45] Date of Patent: May 18, 1999

[54] OPTICAL FIBER COUPLING SYSTEM

[75] Inventor: Roger Lee Jungerman, Petaluma, Calif.

[73] Assignee: Hewlett-Packard Company, Palo Alto, Calif.

[21] Appl. No.: 08/918,798

[22] Filed: Aug. 26, 1997

[51] Int. Cl.$^6$ ................................................. G02B 6/32
[52] U.S. Cl. ................................ 385/31; 385/38; 385/33; 385/25
[58] Field of Search ................................ 385/25, 33, 34, 385/35, 31, 38, 90, 91; 356/73.1

[56] References Cited

U.S. PATENT DOCUMENTS

| | | | |
|---|---|---|---|
| 4,738,527 | 4/1988 | McBrien | 356/5 |
| 4,767,430 | 8/1988 | Deneka et al. | 65/4.2 |
| 4,958,900 | 9/1990 | Ortiz, Jr. | 350/96.18 |
| 5,127,725 | 7/1992 | Mueller et al. | 356/73.1 |
| 5,508,802 | 4/1996 | Boehme et al. | 356/73.1 |

*Primary Examiner*—Hung N. Ngo
*Attorney, Agent, or Firm*—John L. Imperato

[57] ABSTRACT

An optical fiber coupling system has high insertion loss repeatability. A lens expands the mode size of a source fiber connected to a test instrument or other source, reducing insertion loss sensitivity to positional and angular alignment of the bare input fiber with the source fiber. Index matching fluid reduces the effect of the cleave angle of the input fiber on insertion loss. The optical fiber coupling system is calibrated by substituting a through fiber of similar type and length in place of the input fiber. According to a first preferred embodiment of the present invention, a capillary tube contains the index matching fluid. According to a second preferred embodiment of the present invention, the index matching fluid is contained in a reservoir enabling optical signals to be coupled to optical components having multiple input fibers.

10 Claims, 7 Drawing Sheets

OPTICAL FIBER COUPLING SYSTEM

BACKGROUND OF THE INVENTION

A variety of optical components, such as those used in wavelength division multiplexed (WDM) systems, are equipped with bare fiber interfaces. Optical signals are coupled into the bare fibers to measure performance parameters of the optical components before the components are installed into a WDM system. Measurement accuracy depends on repeatability of the insertion loss of the signal coupling into the bare fiber. Micropositioners may be used to image optical signals directly onto the bare fibers, but insertion loss is sensitive to the alignment of the optical signals on the bare fiber, and even slight misalignment causes insertion loss variations. Alignment sensitivity may be reduced by imaging a filtered white light source onto the bare fiber, but coupling white light into the fiber is inherently inefficient and does not provide enough optical signal strength to test wide dynamic range optical components, such as those used in the WDM systems. In addition, polarization characterization and optical time-domain reflectometry measurements are not conveniently performed using white light. Fusion splicing the bare fibers provides highly repeatable insertion loss, but it is time consuming, especially when the optical component being measured has multiple bare fibers. Bare fiber adapters have short set-up times, allowing bare fibers to be coupled quickly, but the adapters have poor insertion loss repeatability. Accordingly, there is a need for an optical fiber coupling system that has repeatable insertion loss and that also allows for quick coupling of optical signals to bare fibers.

SUMMARY OF THE INVENTION

According to the preferred embodiments of the present invention, an optical fiber coupling system has highly repeatable insertion loss and has short set-up time, providing for quick coupling of optical signals into bare fibers. A lens expands the mode size of a source fiber connected to a test instrument or other optical source, reducing insertion loss sensitivity to positional alignment of the bare fiber with the source fiber. Index matching fluid reduces the effect of the cleave angle of the bare fiber on insertion loss and reduces back reflections in the optical fiber coupling system. The optical fiber coupling system is calibrated by substituting a calibration fiber in place of the input fiber and measuring the insertion loss of the calibration fiber. According to a first preferred embodiment of the present invention, a capillary tube contains the index matching fluid and surface tension maintains the index matching fluid at the interface between the cleaved end of the bare fiber and a glass slide positioned at the end of the bare fiber. According to a second preferred embodiment of the present invention, index matching fluid is contained in a reservoir into which multiple bare fibers may be inserted. An optional thermal management system controls the temperature of the index matching fluid to reduce optical signal reflections in the optical fiber coupling system.

DETAILED DESCRIPTION OF THE PREFERRED EMBODIMENT

Figure 1B:
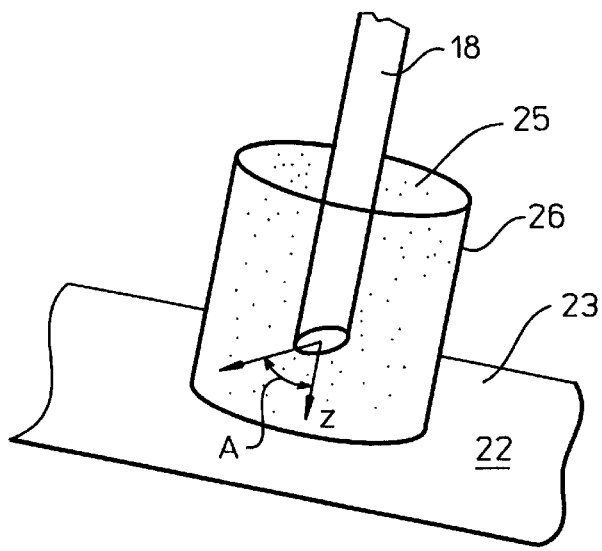
FIGS. 1A–1C show an optical fiber coupling system constructed according to a first preferred embodiment of the present invention.
Figure 1A:
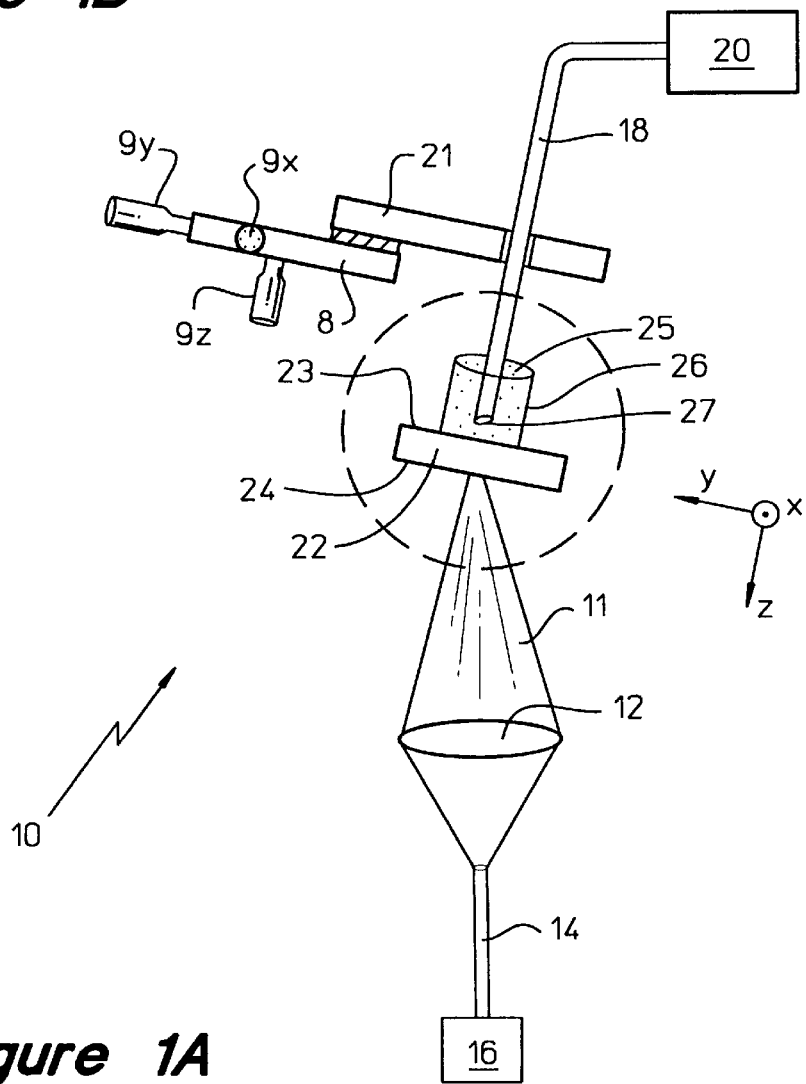

FIG. 1A shows an optical fiber coupling system 10 constructed according to a first preferred embodiment of the present invention. A lens 12 expands the mode size of a source fiber 14 supplied by a test instrument, laser diode or other optical source 16. The expanded beam 11 is imaged onto a bare input fiber 18 that is coupled to an optical amplifier, switch or other type of optical component 20 being measured. The expanded beam 11 introduces an offset in the insertion loss of the optical signal coupling between the source fiber 14 and the input fiber 18, but the dependence of the insertion loss on lateral (x-axis and y-axis) alignment and longitudinal (z-axis) alignment of the source fiber 14 with the input fiber 18 is reduced relative to that of an unexpanded beam. As an example, a beam expansion of four times (4×) introduces an insertion loss offset of 6.55 dB, but this insertion loss is highly repeatable for each input fiber 18 inserted into the optical fiber coupling system 10. The repeatable insertion loss allows for accurate calibration of the optical fiber coupling system 10 and provides for accurate measurements of optical components 20. The optical fiber coupling system 10 is calibrated by substituting a calibration fiber (not shown) of similar type and length to the input fiber 18 of the optical component 20 in place of the input fiber 18. The insertion loss of the coupling of optical signals into the calibration fiber is substantially equal to the insertion loss of the coupling into the bare input fiber 18 of the optical component 20. Thus, by measuring the insertion loss of the calibration fiber and then subtracting the measured insertion loss, or otherwise accounting for the measured insertion loss in the coupling of optical signals, the performance parameters of the optical component 20 are isolated.

The insertion loss resulting from the expanded beam 11 may be unacceptably high for some applications, but for measuring optical components 20 of WDM systems, the benefits of increased measurement accuracy and quick set-up time of the optical fiber coupling system 10 far outweigh the effects of the higher insertion loss. The measurement accuracy provided by the optical fiber coupling system 10 improves test yields by reducing measurement error budgets, and the quick set-up time increases measurement throughput, decreasing the cost of testing the optical components 20.

Figure 2A:
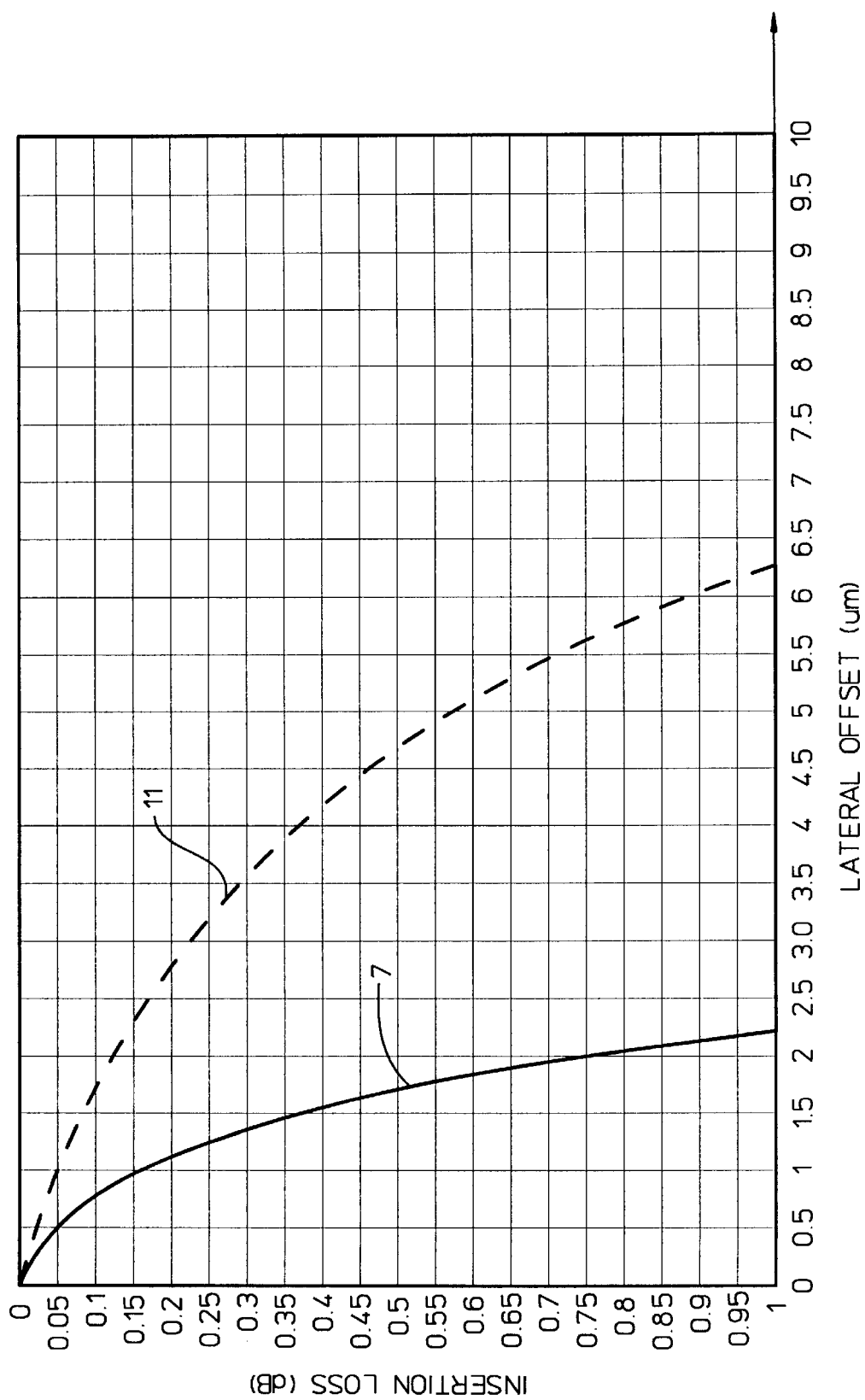
FIGS. 2A–2C shows the dependence of insertion loss on fiber alignment for the optical fiber coupling system.
Figure 2B:
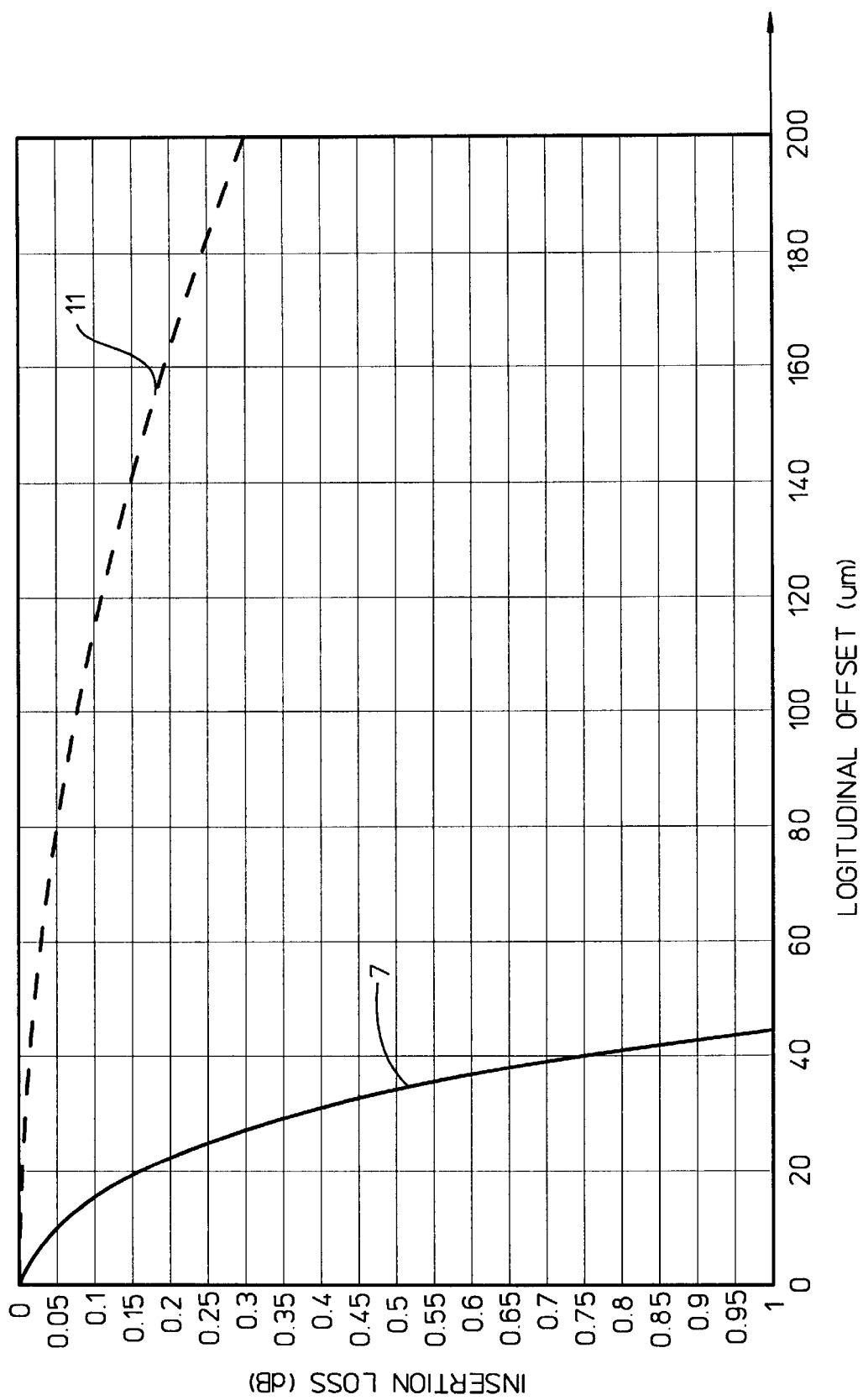
Figure 2C:
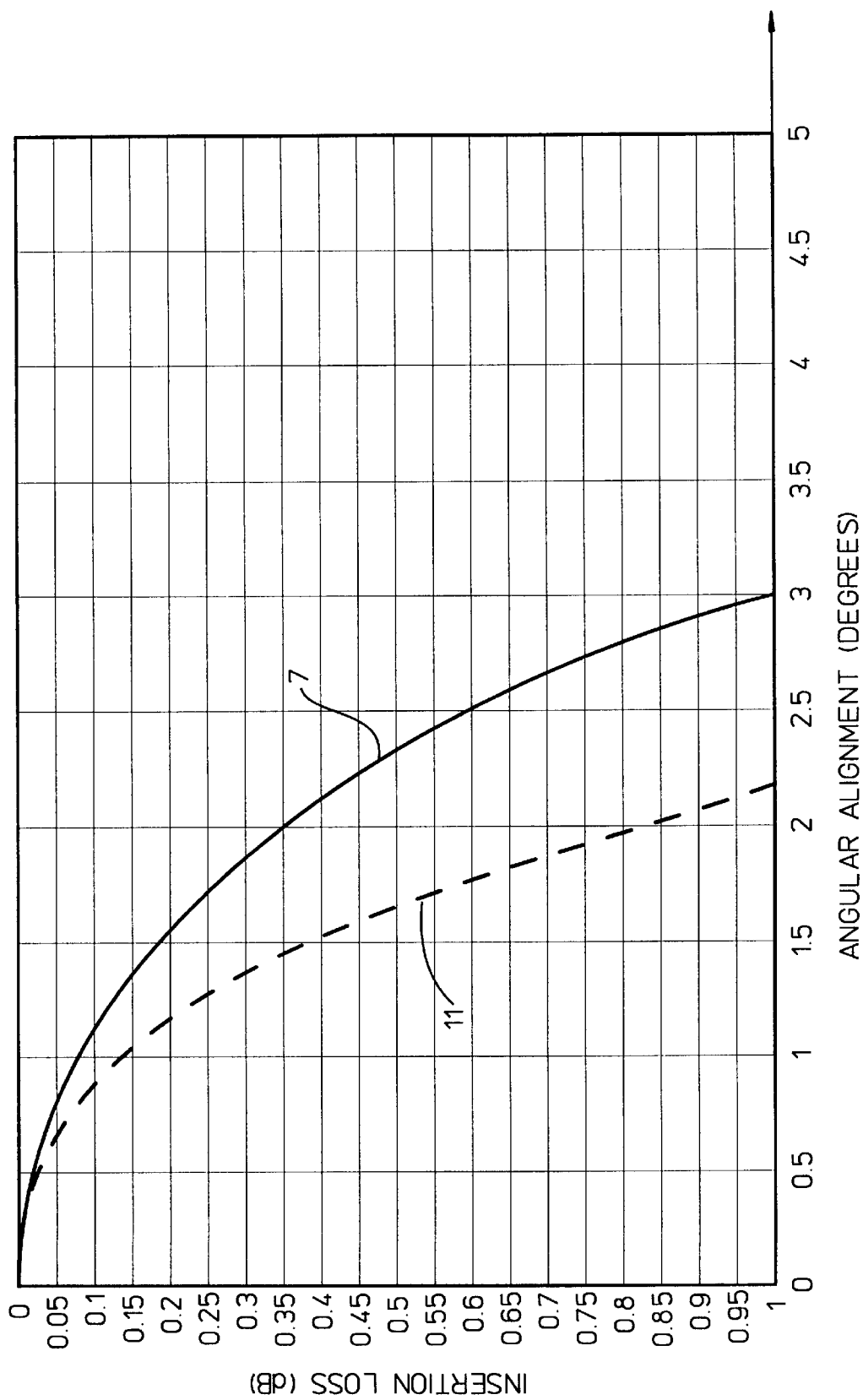

FIG. 2A shows the insertion loss dependence on lateral (x-axis or y-axis) offset between the source fiber 14 and the input fiber 18. The insertion loss dependence is shown for both a four times (4×) beam expansion, or 4× magnification factor, and an unexpanded beam 7. FIG. 2B shows the insertion loss dependence on longitudinal (z-axis) offset between the source fiber 14 and the input fiber 18, for the 4× expanded beam 11 and an unexpanded beam 7. FIG. 2C shows the insertion loss dependence on angular alignment between the source fiber 14 and the input fiber 18, for the 4× expanded beam 11 and an unexpanded beam 7. As an example, a lateral alignment along the x-axis direction or y-axis direction within 1.5 micrometers (um) provides an insertion loss repeatability of 0.05 dB when using the 4× magnification factor, whereas a 0.5 um alignment is required to achieve the same repeatability for an unexpanded beam 7. Lateral alignment of 1.5 um is readily obtained using commercially available automated alignment systems. Lateral alignment of 0.5 um is more difficult to achieve. Longitudinal alignment along the z-axis direction within 80 um is required to achieve the 0.05 dB insertion loss repeatability for the expanded beam 11. This longitudinal alignment tolerance of 80 um is substantially easier to achieve than the 9 um longitudinal alignment tolerance that would be required by an unexpanded beam 7.

The expanded beam 11 reduces insertion loss sensitivity to positional alignment in both the lateral and longitudinal directions, while producing only a negligible increase in sensitivity to angular alignment between the source fiber 14 and the input fiber 18. Insertion loss repeatability of 0.05 dB is achieved for an angular alignment within 0.7 degrees for an unexpanded beam 7, while the 4× expanded beam requires angular alignment to within 0.5 degrees. Placement of the input fiber 18 in a V-groove fixture 21 enables an angular alignment within 0.5 degrees to be readily obtained. For example, a V-groove 5 mm long having a positional offset tolerance of +/−10 um, which is readily achieved using machining or photolithographic processes, produces in an angular alignment within +/−0.2 degrees. The magnification factor of the lens 12 is chosen so that the desired insertion loss repeatability is achieved when the cleaved end 27 is positioned within the positional tolerance of the positioning mechanism of the optical fiber coupling system. For example, positioning mechanisms having large positional tolerances require a larger magnifaction factor to achieve a predefined insertion loss repeatability than position mechanisms having small positional tolerances.

Figure 1C:
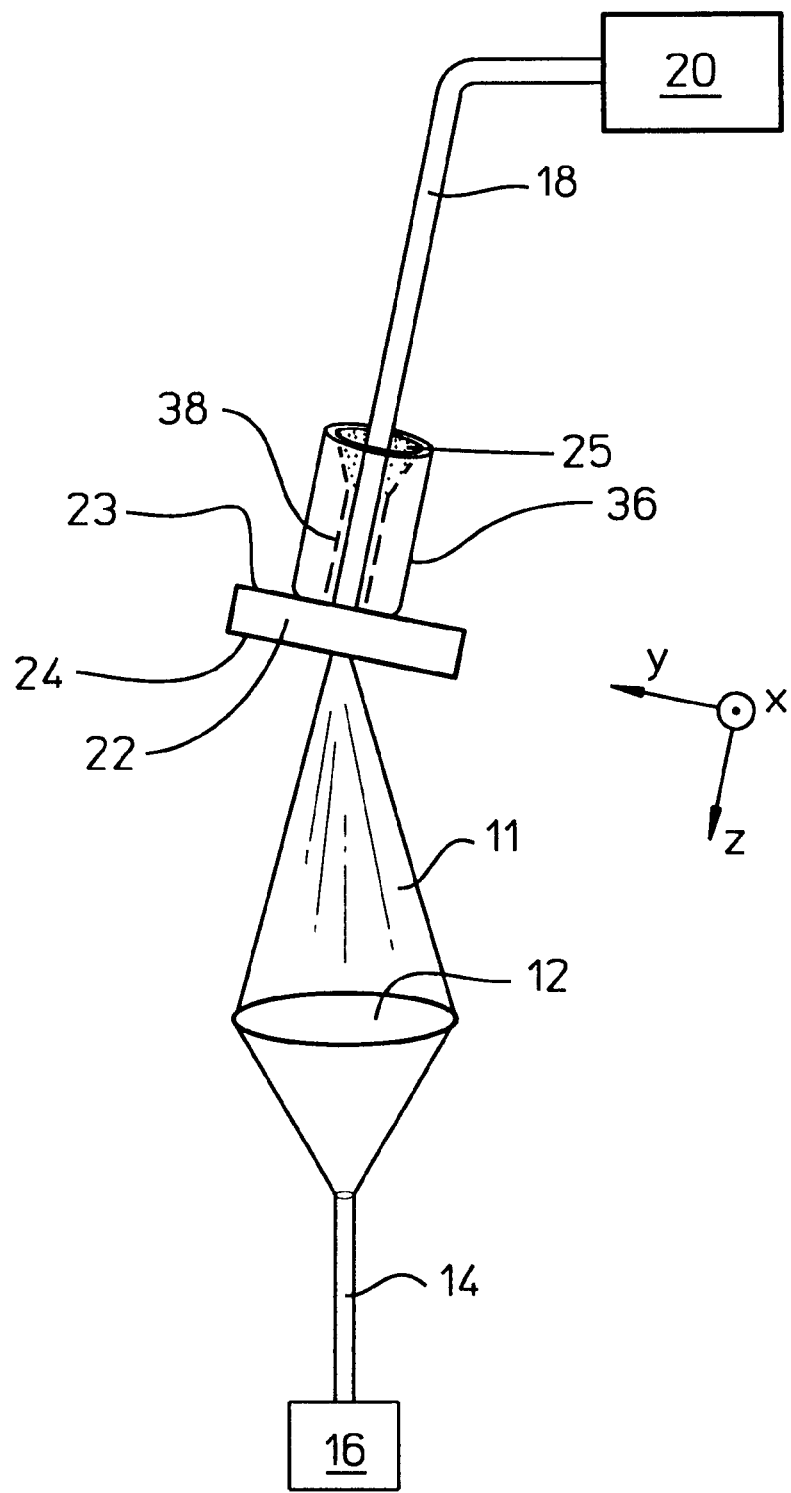

A variety of positioning mechanisms are used to position the cleaved end 27 of the bare input fiber 18 relative to the expanded beam 11. For example, a translation stage 8 with micrometers 9x, 9y, and 9z, coupled to fixture 21, is used to translate the input fiber 18 in the lateral (x-axis and y-axis) direction and the longitudinal (z-axis) direction. Alternatively, the positioning mechanism is formed by inserting the input fiber 18 into a precision capillary tube 36 as shown in FIG. 1C. The lateral position of the input fiber 18 is determined by the bore 38 of the precision capillary tube 36 while the longitudinal position is determined by the insertion depth of the input fiber 18 in the bore 38.

Insertion loss also depends upon the cleave angle A of the bare fiber, shown in FIG. 1B, which is difficult to control. FIG. 1B is a detailed view of the cleaved end 27 of the input fiber of the optical fiber coupling system 10 shown in FIG. 1A. In the absence of compensation for variations in the cleave angle A, insertion loss variations of greater than 0.05 dB are likely to result at the angled fiber/air interface. Index matching fluid 25 placed between the cleaved end 27 of the bare input fiber 18 and a cover glass 22 renders the insertion loss of the optical fiber coupling system 10 independent of the cleave angle A of the input fiber 18. The index matching fluid 25 is contained in a well, which may be formed by a depression (not shown) in the top surface 23 of the cover glass 22 or formed by a capillary tube 26 at the interface between the input fiber 18 and the cover glass 22. The capillary tube 26 is adhered to the cover glass 22 and surface tension holds the index matching fluid 25 in position. The cover glass 22 is positioned so that the top surface 23 and bottom surface 24 of the coverglass 22 are in a non-orthogonal relationship to the z-axis of the input fiber 18 to improve the optical return loss by directing reflections away from the longitudinal (z) axis of the input fiber 18. An anti-reflection coating on the angled cover glass 22 reduces polarization dependent loss in the optical fiber coupling system 10.

Figure 3:
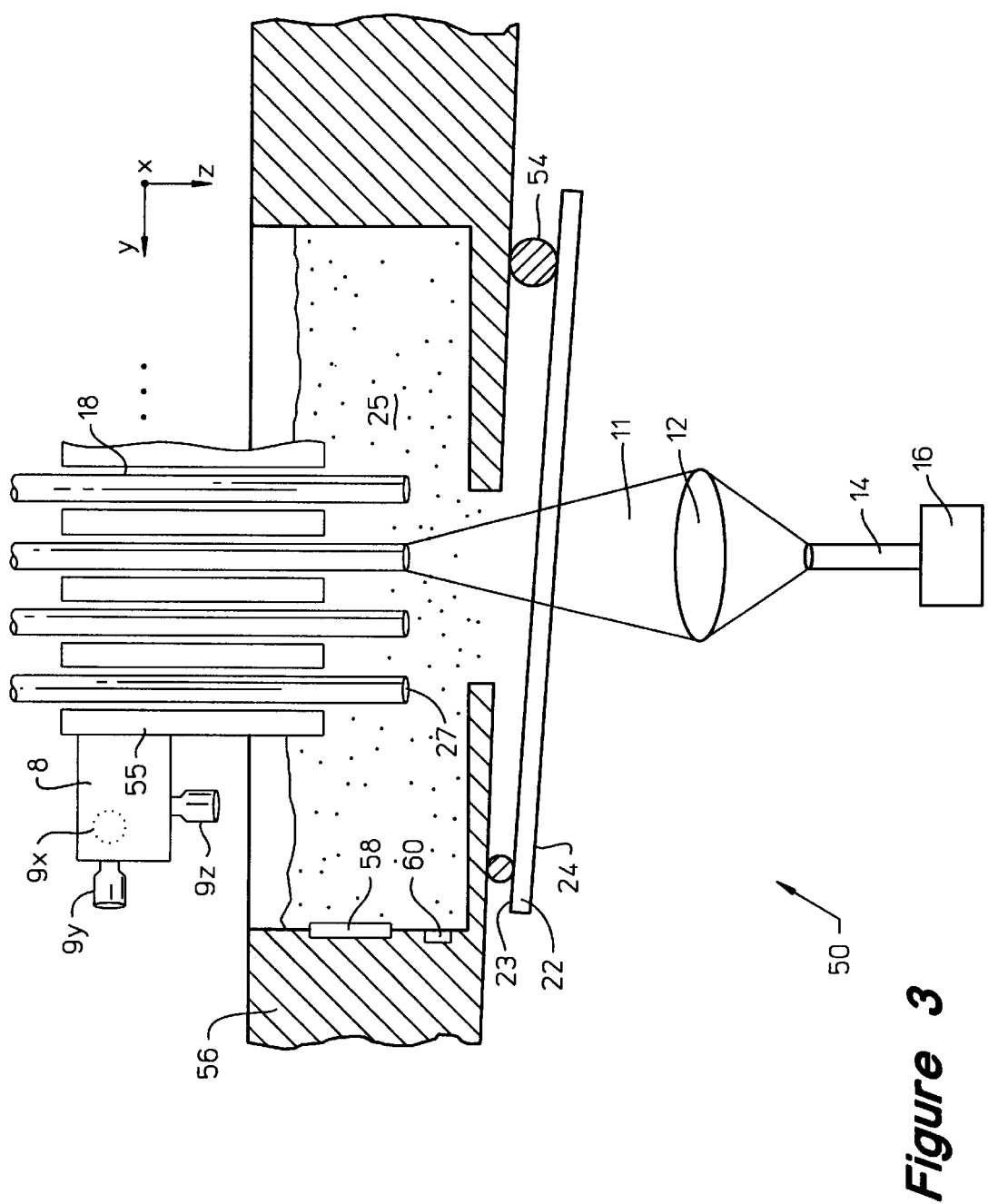
FIG. 3 shows an optical fiber coupling system constructed according to a second preferred embodiment of the present invention.

FIG. 3 shows an optical fiber coupling system 50 constructed according to a second preferred embodiment of the present invention. The index matching fluid 25 is contained in a reservoir having a seal 54 between a housing 56 and coverglass 22. An optional thermal management system has temperature control element 58, such as a Peltier device, and has a temperature sensing element 60, such as a thermistor. The temperature sensing element 60 senses the temperature of the index matching fluid 25 and the temperature control element 58 heats or cools the index matching fluid 25 accordingly, to maintain the temperature of the index matching fluid 25 within a tight temperature range. Other suitable thermal management systems may be used to maintain the temperature of the index matching fluid 25. For example, the entire optical fiber coupling system may be placed in a temperature chamber or oven (not shown).

Figure 4:
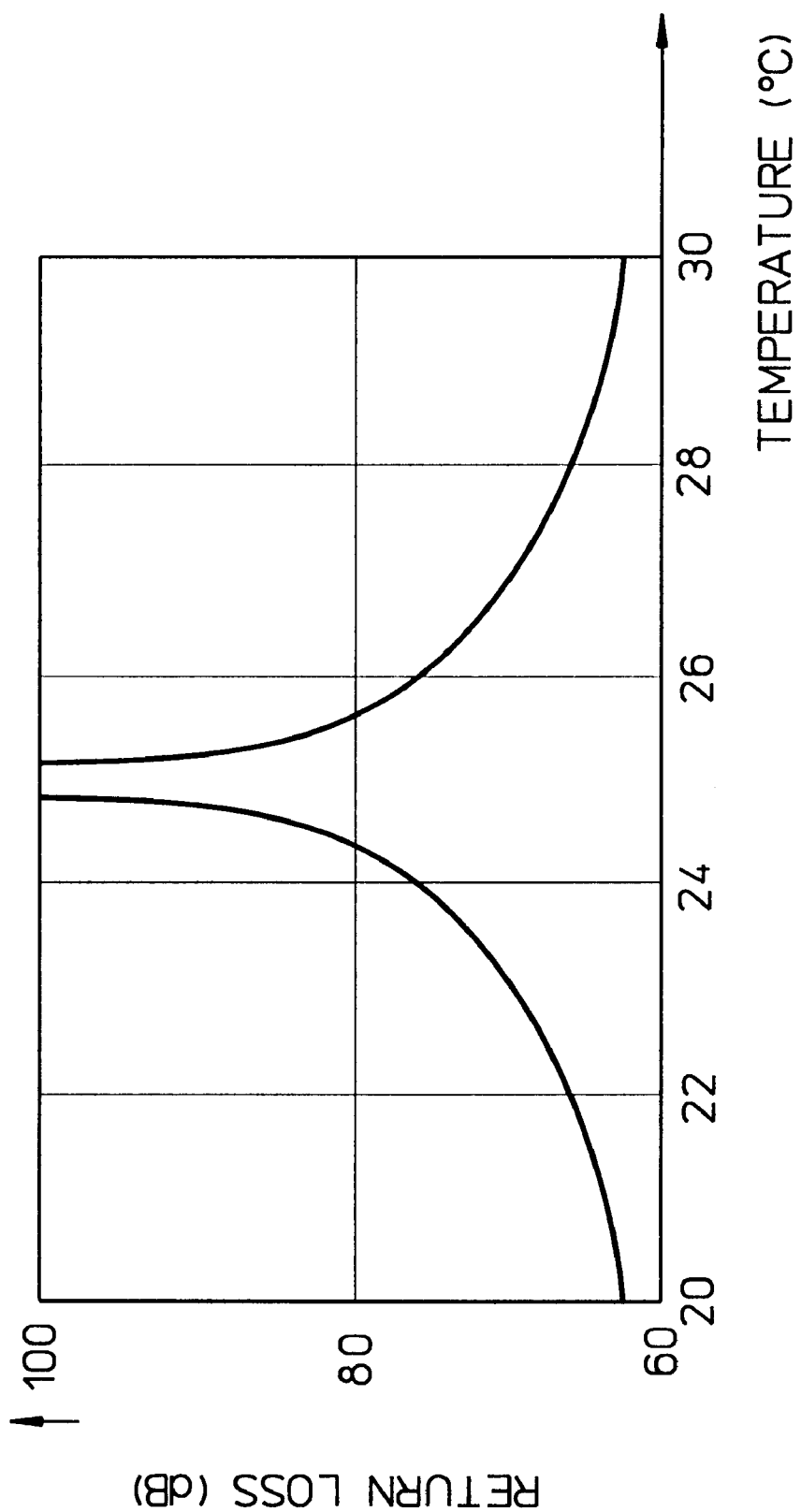
FIG. 4 shows optical return loss for the optical fiber coupling system of FIG. 3.

FIG. 4 shows optical return loss of the optical fiber coupling system 50 versus the temperature of the index matching fluid 25. Maintaining the index matching fluid to within +/−1 degree C., maintains the refractive index of the index matching fluid to within +/−0.000386 using commercially available index matching fluids and reduces optical return loss of the optical fiber coupling system 50 to more than 80 dB. In the absence of the thermal management system, optical return loss of more than 60 dB is achieved over a broad temperature range.

The optical fiber coupling system 50 readily accommodates optical components having multiple bare fibers 18. A fixture 55 having multiple V-grooves each holding a corresponding input fiber 18 is convenient for measuring optical components 20 having multiple bare input fibers 18. The cleaved ends 27 of the input fibers are immersed in the index matching fluid 25 and the fixture 55 is moved in the lateral (x-axis and y-axis) directions, using a positioning mechanism having a translation stage 8 and micrometers 9x, 9y and 9z, to couple the expanded beam 11 to each of the multiple input fibers 18.

What is claimed is:

1. A system for coupling an optical signal into an optical fiber having a predefined range of insertion loss, the system comprising:

a lens receiving an applied optical signal and magnifying the beam diameter of the optical signal by a magnification factor;

a glass plate intercepting the magnified beam at a bottom surface;

a well formed on a top surface of the glass plate, receiving an end of the optical fiber;

an index matching fluid within the well interposed between the end of the optical fiber and the glass plate; and a positioning mechanism positioning the end of the optical fiber at a predetermined location in the well to within a positional tolerance and an angular alignment tolerance, the magnification factor of the lens chosen according to the positional tolerance and the angular alignment tolerance, so that the insertion loss is within the predefined range when the end of the optical fiber is within the positional tolerance and the angular alignment tolerance.

2. The system of claim 1 wherein the well is formed from a tube attached to the top surface of the glass plate.

3. The system of claim 2 wherein the positioning mechanism comprises a translation stage and multiple orthogonal micrometers.

4. The system of claim 2 wherein the positioning mechanism comprises the inner bore of the tube.

5. The system of claim 2 further comprising a thermal management system maintaining the index matching fluid at a designated temperature.

6. The system of claim 3 further comprising a thermal management system maintaining the index matching fluid at a designated temperature.

7. The system of claim 4 further comprising a thermal management system maintaining the index matching fluid at a designated temperature.

8. A system coupling an optical signal into an optical fiber and having a predefined range of insertion loss, the system comprising:

a lens receiving an applied optical signal and magnifying the beam diameter of the optical signal by a magnification factor;

a glass plate intercepting the magnified beam at a bottom surface;

a housing having a hole adjacent to a top surface of the glass plate, the hole receiving an end of the optical fiber;

a gasket positioned between the housing and the top surface of the glass plate;

an index matching fluid within the hole interposed between the end of the optical fiber and the glass plate; and a positioning mechanism positioning the end of the optical fiber at a predetermined location in the hole to within a positional tolerance and an angular alignment tolerance, the magnification factor of the lens chosen according to the positional tolerance and the angular alignment tolerance, so that the insertion loss is within the predefined range when the end of the optical fiber is within the positional tolerance and the angular alignment tolerance.

9. The system of claim 8 further comprising a thermal management system maintaining the index matching fluid at a designated temperature.

10. The system of claim 9 wherein the thermal management system includes a temperature sensor and a temperature control element in thermal contact with the index matching fluid.

* * * * *